Figure 1:
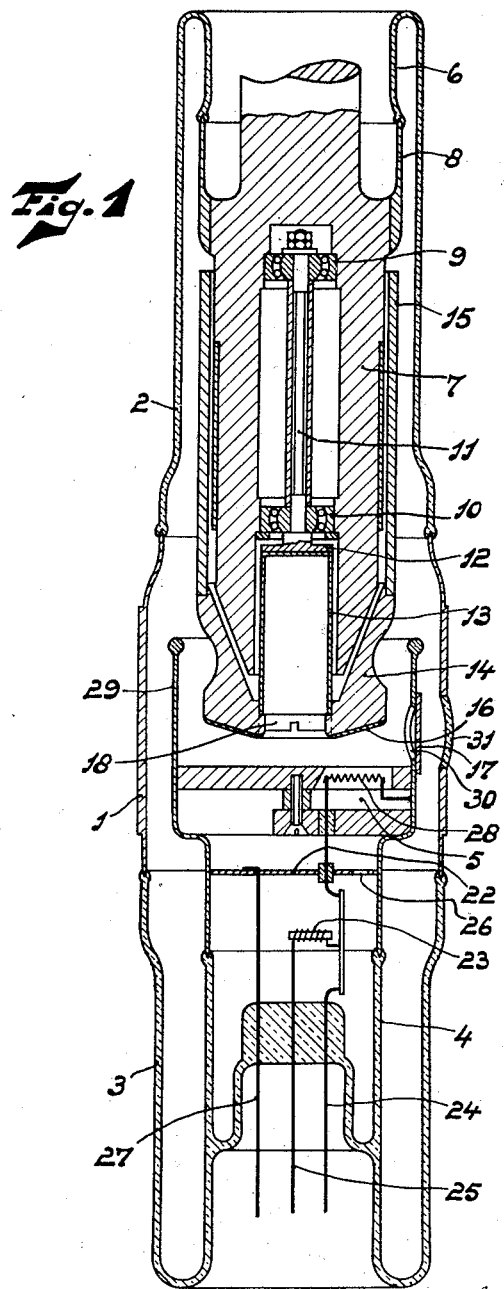

Oct. 31, 1944.  J. E. DE GRAAF  2,361,897
VACUUM VESSEL
Filed Feb. 28, 1940  2 Sheets-Sheet 1

Inventor
Jacob Engel De Graaf
By [signature]
Attorney

Inventor
Jacob Engel De Graaf

Patented Oct. 31, 1944

2,361,897

UNITED STATES PATENT OFFICE 2,361,897

VACUUM VESSEL

Jacob Engel de Graaf, Eindhoven, Netherlands, assignor, by mesne assignments, to Hartford National Bank and Trust Company, Hartford, Conn., as trustee Application February 28, 1940, Serial No. 321,300 In Germany March 9, 1939

7 Claims. (Cl. 250—148)

The use of ball bearings or roller bearings in high-vacuum vessels often entails difficulties. Since, for instance, high-tension insulation is very sensitive to materials having a high vapour pressure the introduction of the materials commonly used for the lubrication of bearings is objectionable. On the other hand in the absence of lubricants the balls or rollers, after suitable deprivation of gases, cut into the races so that the bearings become unserviceable after a short working time.

This difficulty is experienced more particularly in X-ray tubes having a rotary anode, wherein the working conditions are unfavourable on account of continuous temperature variations. It is not without reason that the operating directions for tubes having a rotary anode often include the instruction that the time of rotation of the anode should be reduced as much as possible in order that the tube may not prematurely become unserviceable due to damaged bearings.

The present invention has for its object to improve the ball bearings or roller bearings for high-vacuum vessels and more particularly for X-ray tubes having a rotary anode. It has already been suggested to bring the ball bearings of such X-ray tubes into good thermal contact with a portion which can be kept cool during operation and to separate it by a high thermal resistance from the spot where heat is evolved during operation. In this way it is rendered possible to furnish the ball bearings with grease, provided that the latter has a comparatively low vapour pressure. However, this solution requires much care in mounting, in order that no excess grease is introduced into the tube and the tube thus rendered unserviceable.

The present invention provides another solution of the same problem, which solution requires a preliminary treatment of the bearings, it is true, but obviates the above-mentioned failure in the case of careless mounting.

According to the invention a vacuum vessel comprises a portion journalled on balls or rollers arranged in the vacuous space, the balls and their races being provided with a film-like coating of soft metal. It has been found that this coating yields a material improvement of the running properties. In this manner cutting of the balls or rollers and the phenomena caused thereby, such as increased friction, annoying noise and seizing of the bearings, are no longer experienced. In contradistinction to bearings which are not lubricated the life of the bearings is very considerably increased and is at least as long as that of lubricated bearings.

The hardness of the metal used for establishing the coating must be very different from that of the steel of the balls or rollers and races. Lead is very suitable for this purpose. Furthermore tin, cadmium, zinc and copper may be used.

To produce the coating according to the invention the metal may be introduced in the form of powder into the bearings and the latter may be kept running for a sufficient time to establish the coating.

The invention will be more clearly understood by reference to the accompanying drawings, wherein Fig. 1 is a cross-section of an example of the invention embodied in an X-ray tube having a rotary anode journalled on balls.

Figure 2:
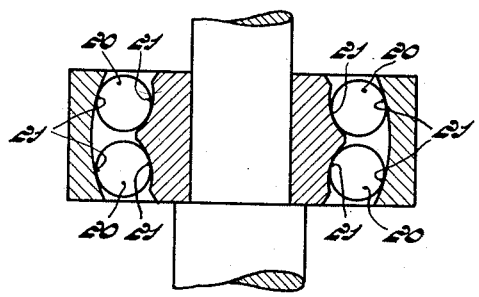

In Fig. 2 a ball-bearing is represented on an enlarged scale.

Figure 3:
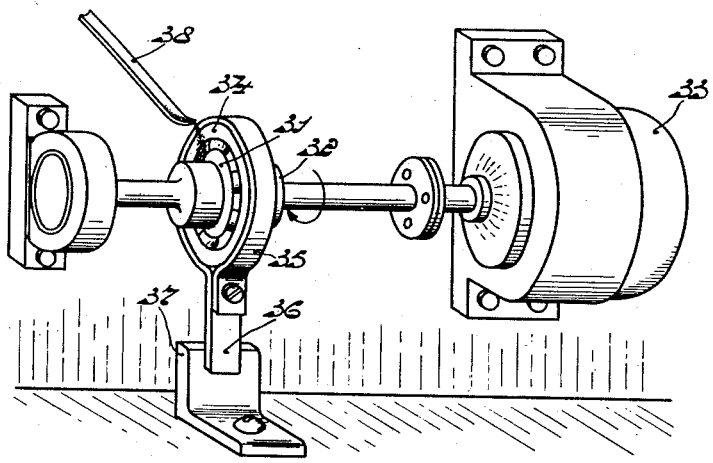

Fig. 3 shows diagrammatically how the ball-bearing is rotatably mounted for the running-in operation.

In the X-ray tube represented in Fig. 1 glass parts 2 and 3 are sealed to a metal part 1 of the wall of the tube. The portion 3 has a re-entrant part 4 by which the cathode system 5 is supported. The portion 2 has also a short re-entrant part 6, whose edge is sealed to a ferro-chromium ring 8 secured to the metal member 7. The member 7 contains ball bearings 9 and 10 in which is journalled a rotary shaft 11.

At the front end of shaft 11 is secured a disc 12 which carries a thin-walled metal tube 13. This metal tube constitutes an intermediate member between the rotary part of the bearing and the body 14 of the rotary anode. This body has a cylindrical extension 15 which acts in known manner as the rotor of an electric motor. The electro-magnetic stator (not represented) provided around the glass portion 2 produces the three-phase magnetic field by which the anode is caused to rotate. The front of the body 14 supports a tungsten disc 16 facing the cathode system and in good thermal contact with the said body. The hole shown in the front part of the anode body 14 permits, during the mounting operation, the metal tube 13 to be secured to the disc 12 by means of a suitable tool, this hole being then obturated by means of a screw 18 so that electrons are prevented from gaining access to the metal tube 13 and heating this tube or the disc.

The cathode system of the X-ray tube consists of a tube which serves as a focussing device and in which a part is separated by a partition 22. This part contains a heating coil 23 associated with a getter-container such as a small copper tube filled with barium. The heating element 23 may be heated by a current supplied through conductors 24 and 25 so that the getter is volatilised. The condensed vapour is deposited on the inner wall of the space separated by the partition 22. Through an aperture 26 this getter-space communicates with the remaining part of the high-vacuum space so that any gases or vapours escaping from some part or other are immediately absorbed and rendered ineffective by the getter in the space below the disc 22.

However, charge-conveying particles, which are accelerated in the electric field of the tube, cannot reach the getter deposit. This is very important since otherwise the absorbed gases may be expelled again from the getter due to the impact of such particles.

The supply conductor 27 together with the wire 24 serves for the supply of heating current to the incandescent member 28 of the cathode.

The focussing device of the cathode ends in the screen 29 which surrounds the front part of the anode and prevents electrons from penetrating from the potential-gradient space into the remaining part of the vacuum space. In this manner detrimental charges are avoided.

The screen 29 and the metal part 1 of the wall are furnished with windows 30 and 31 through which emerges the useful beam of rays. The window 30 is covered by a beryllium disc 17, whereas the metal portion 1 of ferro-chromium has a sealed glass window.

Since the ball bearings engage the portion 7, which can be cooled during operation, and the tube 13, through the intermediary of which they are connected to the rotary body and which consists, for instance, of ferro-chromium, has a low thermal conductivity, they are protected against undue increase of temperature. Nevertheless the ball bearings, in the absence of a lubricant, would not be durable and the operating life of such an X-ray tube would be very limited without the use of the invention, due to failure of such bearings.

To avoid this drawback the balls 20 and the races 21 of the ball bearings (Fig. 2) are, according to the invention, furnished with a coating consisting of lead or of another suitable soft metal. The lead layer is extremely thin. In view of the available amount of play, it may usually not be thicker than about 5 microns.

The lead coating prevents the balls from cutting into the metal of the races and probably has the same effect as a lubricant, whereas trouble due to lubricant affecting the high-vacuum is not manifest.

With the bearing according to the invention the "lubricant" together with the substratum constitutes a solid assembly. Trouble on account of detached material is not experienced. If material is detached at all, there is only a small quantity thereof so that it does not interfere, and possibly it is rolled in again during operation.

Figure 3 shows a ball bearing which is to be provided with the coatings according to the invention. The inner ring 31 is rigidly fastened to a rotary shaft 32 which is driven from an electric motor 33 in the direction of the arrow. The outer ring 34 carries a clamping device 35 comprising a projecting part 36. Owing to the internal friction of the ball bearing the portion 36 follows its movement until it abuts against the stop 37. During rotation a small quantity of metal powder, preferably lead powder, is poured into the space between the balls by means of a spoon 38. Then the friction increases which is manifest by an increase in the force with which the portion 36 engages the stop 37. Owing to rotation of the shaft the lead powder is rubbed into the surface of the balls and races, and the friction decreases again to the normal value.

After the device has been operated for several hours and the introduction of small quantities of lead powder has been repeated during this time the desired surface layer ensues. It has been found that a running-in time of about ten hours is usually sufficient to establish a suitable layer. In this case the bearings in an X-ray tube as shown in Fig. 1 run lightly so as to permit the rotor to be driven almost in synchronism with the three-phase magnetic field.

In order to avoid the occlusion of oxygen or other gases, running-in of the bearings may be effected in a vacuum or in a gaseous atmosphere such as argon. In the construction of the bearings shown in Fig. 1, where they are protected from excessive heating, this is not absolutely necessary but when release of gas from the bearings is to be taken into account it may be useful to avoid the occlusion of gas as much as possible.

Claims directed to the method of forming the coating are being presented in my divisional application Serial No. 340,414 filed June 13, 1940.

What I claim is:

1. An electric discharge device comprising an evacuated container, a ball-bearing within the evacuated space of the container, a member mounted on said bearing, and a thin coating of a metal on the surfaces of the balls and races of said bearing, said metal being considerably softer than the material of the balls.

2. An electric discharge device comprising an evacuated container, a ball-bearing within the evacuated space of the container, a member mounted on said bearing, and a thin coating of lead on the surfaces of the balls and races of said bearing.

3. An X-ray tube comprising an evacuated envelope, a ball-bearing within the evacuated space, an anode rotatably mounted on said bearing, and a thin coating of lead on the surfaces of the balls and races of said bearing.

4. An X-ray generator comprising an evacuated casing, cathode and cooperating anode means in said casing, bearing means turnably supporting said anode means within said casing, said bearing means having working surfaces, and a metallic lubricating medium coated as a thin film on said working surfaces.

5. In an evacuated envelope, a bearing which comprises races and elements rolling between said races, the races and elements being made of a hard metal and the elements being covered with a thin layer of softer metallic substance, said softer metallic substance being capable of acting as a lubricant for said elements, and constituting the sole lubricant therefor, said softer metallic substance preferably having a low vapor pressure and a low affinity for said hard metal, the working surfaces of the races and the layer of softer metallic substance being free of occluded gases which otherwise would be released upon a rise in temperature within the envelope.

6. In a vacuum tube apparatus which comprises an evacuated envelope, a support within the envelope, and a rotor mounted on the support, a bearing interposed between the rotor and the support and comprising bearing members having working surfaces in contact and rolling one upon the other, said members being made of a hard metallic substance, and a thin layer of a softer metallic substance on the working surface of at least one of the members, said softer metallic substance serving as a lubricant for the bearing and constituting the sole lubricant therefor.

7. In an X-ray apparatus which comprises an evacuated envelope, a support within the envelope, and a rotor mounted on the support and carrying a target, a bearing interposed between the rotor and support and comprising races secured to the member and support, respectively, and made of a hard ferrous alloy, rolling elements between the races also made of a hard ferrous alloy, and a layer of a softer metallic substance on the surfaces of the rolling elements, said softer metallic substance serving as the lubricant for the bearing, constituting the sole lubricant therefor, and preferably having a low vapor pressure and a low affinity for the alloys of which the races and balls are, respectively, made.

JACOB ENGEL DE GRAAF.